United States Patent [19]

Kim

[11] Patent Number: 5,548,339
[45] Date of Patent: Aug. 20, 1996

[54] DATA SEGMENT SYNC SIGNAL DETECTOR FOR HDTV

[75] Inventor: Key H. Kim, Kyungki-do, Rep. of Korea

[73] Assignee: LG Electronics Inc., Seoul, Rep. of Korea

[21] Appl. No.: 420,739

[22] Filed: Apr. 12, 1995

[30] Foreign Application Priority Data

Apr. 12, 1994 [KR] Rep. of Korea ............... 7622/1994

[51] Int. Cl.$^6$ ................................... H04N 5/08
[52] U.S. Cl. ........................... 348/525; 348/500; 375/368
[58] Field of Search .................... 348/471, 472, 348/525, 529, 530, 531, 500; 375/368, 364, 365, 342; 370/105.4, 105.5, 106; 358/153; H04N 5/08, 5/10, 5/12

[56] References Cited

U.S. PATENT DOCUMENTS 4,414,676 11/1983 Kraul et al. ................... 375/368
5,191,434 3/1993 Kim ........................... 358/335
5,416,524 5/1995 Citta et al. ................... 348/471
5,420,895 5/1995 Kim ........................... 375/368

*Primary Examiner*—Victor R. Kostak
*Assistant Examiner*—Chris Grant
*Attorney, Agent, or Firm*—John P. White

[57] ABSTRACT

A data segment sync signal detector for an HDTV is disclosed including a segment accumulator for separating data corresponding to a segment sync signal from a composite baseband data signal by using a composite baseband data signal of the present segment to a composite baseband data signal of a previously input segment; a quantizer for comparing the output signal of the segment accumulator with predetermined threshold values so as to output level values in a predetermined number of bits, corresponding to a plurality of fixed symbol streams, that is, segment sync signal data; and a segment sync signal pattern detector for detecting the pattern of segment sync signal from the level values expressed in the predetermined number of bits output from the quantizer, thereby obtaining the phase information for respective segments and making respective segment phase pulses according to the phase information.

14 Claims, 3 Drawing Sheets

DATA SEGMENT SYNC SIGNAL DETECTOR FOR HDTV

BACKGROUND OF THE INVENTION

The present invention relates to a high-definition (HD) television receiver, and more particularly, to a data segment sync signal detector for an HDTV.

There have been carried out many studies on HDTV. Grand Alliance HDTV system specification, a standard for USA HDTV transmission method, was announced on Feb. 22, 1994.

According to this grand alliance HDTV system specification, error control coding is performed on video data for the purpose of transmitting/receiving compressed video data in a digital mode.

In the NTSC system, a video blanking interval is present between frames in order to discriminate respective frames. A vertical sync signal for distinguishing frames is loaded in the intervals. For the discrimination of lines in a frame, a video blanking interval is present between the lines, loading a horizontal sync signal.

Similarly, in HDTV systems, data blanking interval exists in units of segment and field. This interval contains a data segment sync signal, and a data field sync signal.

FIG. 1 illustrates one segment of data format in accordance with the Grand Alliance HDTV transmission system.

In FIG. 1, a data segment sync signal is loaded in the data blanking interval presented in units of segment, and transmitted from a broadcasting station, without being error-control-code. Here, the compressed video data loaded between the respective data segment sync signals is error-control-coded for transmission.

The data segment sync signal is considered to facilitate recovery of received video data in synchronization.

For this reason, an HDTV recovers the data segment sync signal prior to the complete recovery of the received video data, forming a data symbol clock from the data segment sync signal.

In other words, data corresponding to the data segment sync signal which is not error-control-coded, is loaded in front of the error-control-coded data segment. A receiver detects the data, making the data segment sync signal. Using the clocks in synchronization with the data segment sync signal, a received composite baseband data signal is converted into analog. Accordingly, this implements a synchronous receiving system.

Generally speaking, in a digital transmitting/receiving system, a waveform on which only one symbol is loaded for one symbol period (T) is transmitted so that the receiver side detects the phase of the symbol from the received waveform, recovering the symbol information accurately.

However, as shown in FIG. 2, when the phase of the recovered symbol clock involves an error, the amplitude of the symbol information has an error.

FIG. 3 is a block diagram of an apparatus for recovering the data sync signal and data symbol clock in the Grand Alliance HDTV receiver.

In the aforementioned Grand Alliance HDTV system, four fixed symbol streams are loaded on the video data format as data corresponding to the data segment sync signal for every segment period.

For this reason, in the apparatus of FIG. 3, an A/D converter 1 converts received composite baseband video data into digital. A data segment sync signal detector 2 detects four fixed symbols corresponding to a data segment sync signal from the digital data for every segment period, forming the data segment sync signal for every segment period.

A phase-locked loop 3 uses the data segment sync signal to make a symbol clock in synchronization therewith. The clock is given to A/D converter 1. By doing so, the phase of symbol can be recovered accurately. As noted above, in order for accurate recovery of symbol, a data segment sync signal must be first of all detected precisely.

SUMMARY OF THE INVENTION

Therefore, it is an object of the present invention to provide a data segment sync signal detector for accurately detecting a data segment sync signal for every segment period in a HDTV system.

To accomplish the object of the present invention, there is provided a data segment sync signal detector for an HDTV including a segment accumulator for separating data corresponding to a segment sync signal from a composite baseband data signal by using a composite baseband data signal of the present segment to a composite baseband data signal of a previously input segment; a quantizer for comparing the output signal of the segment accumulator with predetermined threshold values so as to output level values in a predetermined number of bits, corresponding to a plurality of fixed symbol streams, that is, segment sync signal data; and a segment sync signal pattern detector for detecting the pattern of segment sync signal from the level values expressed in the predetermined number of bits output from the quantizer, thereby obtaining the phase information for respective segments and making respective segment phase pulses according to the phase information.

BRIEF DESCRIPTION OF THE ATTACHED DRAWINGS

DETAILED DESCRIPTION OF THE INVENTION

Figure 1:
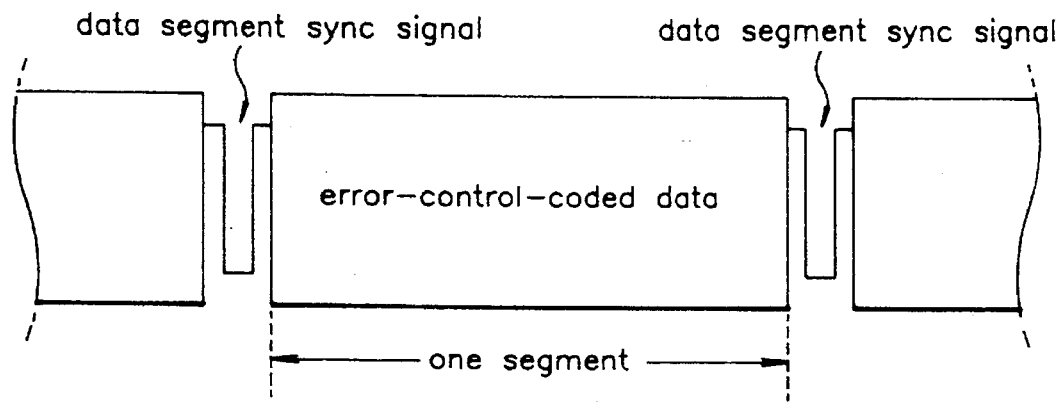
FIG. 1 is a diagram of data format corresponding to one segment in Grand Alliance HDTV transmission system.
Figure 2:
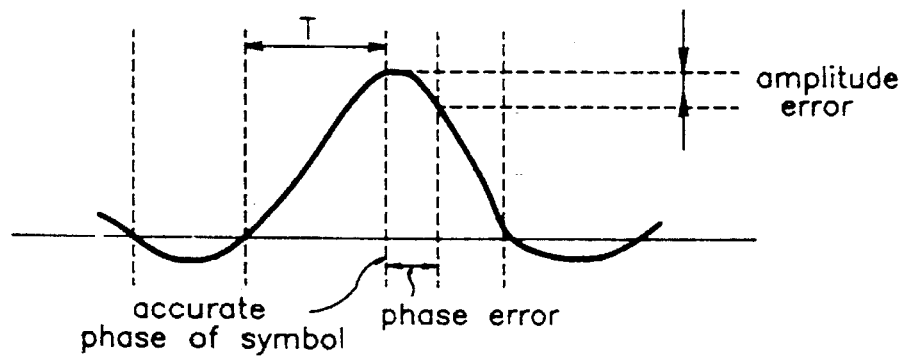
FIG. 2 illustrates the amplitude error of symbol information due to the phase error of a symbol clock.
Figure 3:
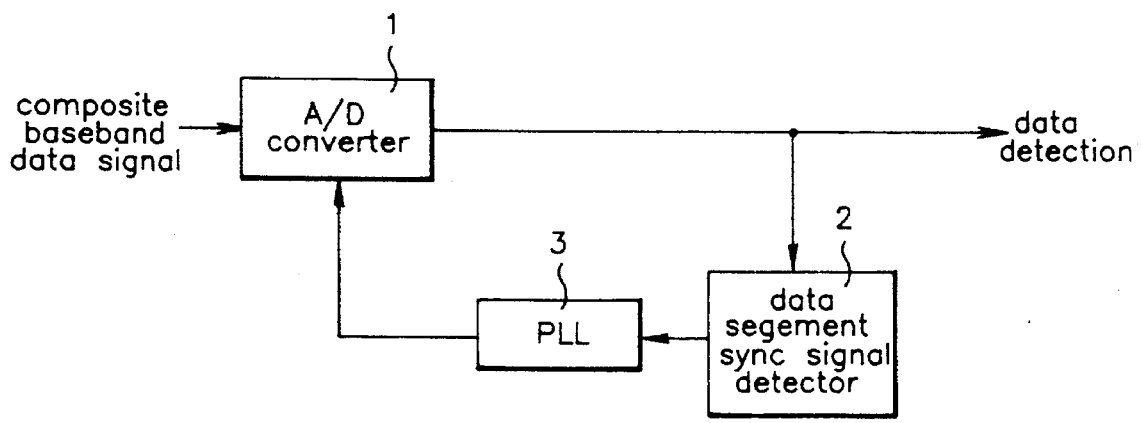
FIG. 3 is a block diagram of an apparatus for recovering a data segment sync signal and data symbol clock in Grand alliance HDTV system.
Figure 4:
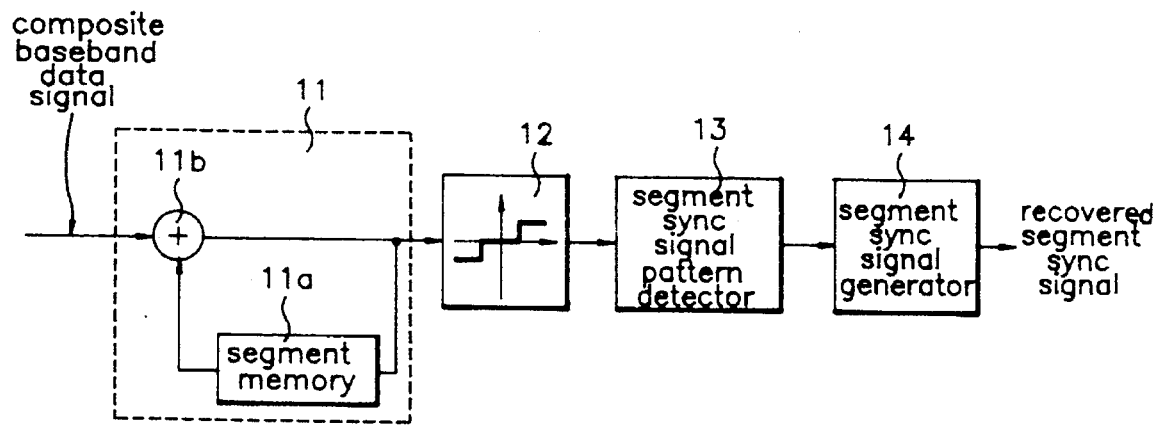
FIG. 4 is a block diagram of a data segment sync signal detector of the present invention.

Hereinafter, a preferred embodiment of the present invention will be described with reference to the attached drawings.

The data segment sync signal detector of the present invention comprises a segment accumulator 11, a quantizer 12, a segment sync signal pattern detector 13, and a segment sync signal generator 14.

Segment accumulator 11 separates data corresponding to a segment sync signal from a composite baseband data signal by adding the composite baseband data signal of the present segment to the composite baseband data signal of a previously input segment.

Quantizer 12 compares the output signal of segment accumulator 11 with predetermined threshold values so as to output level values in a predetermined number of bits (two bits in this case), corresponding to a plurality of (four in this case) fixed symbol streams, that is, segment sync signal data.

Segment sync signal pattern detector 13 detects the pattern of segment sync signal from the level values expressed in the predetermined number of bits output from quantizer 12, thereby obtaining the phase information for respective segments and making respective segment phase pulses according thereto.

Segment sync signal generator 14 uses the segment phase pulse output from segment sync signal pattern detector 13, to make a recovered segment sync signal.

Here, segment accumulator 11 comprises a segment memory 11a for delaying a composite baseband data signal in units of segment for one segment, and an adder 11b for adding the composite baseband data signal of the previous segment output from segment memory 11a and the composite baseband data signal of a currently input segment.

Figure 5:
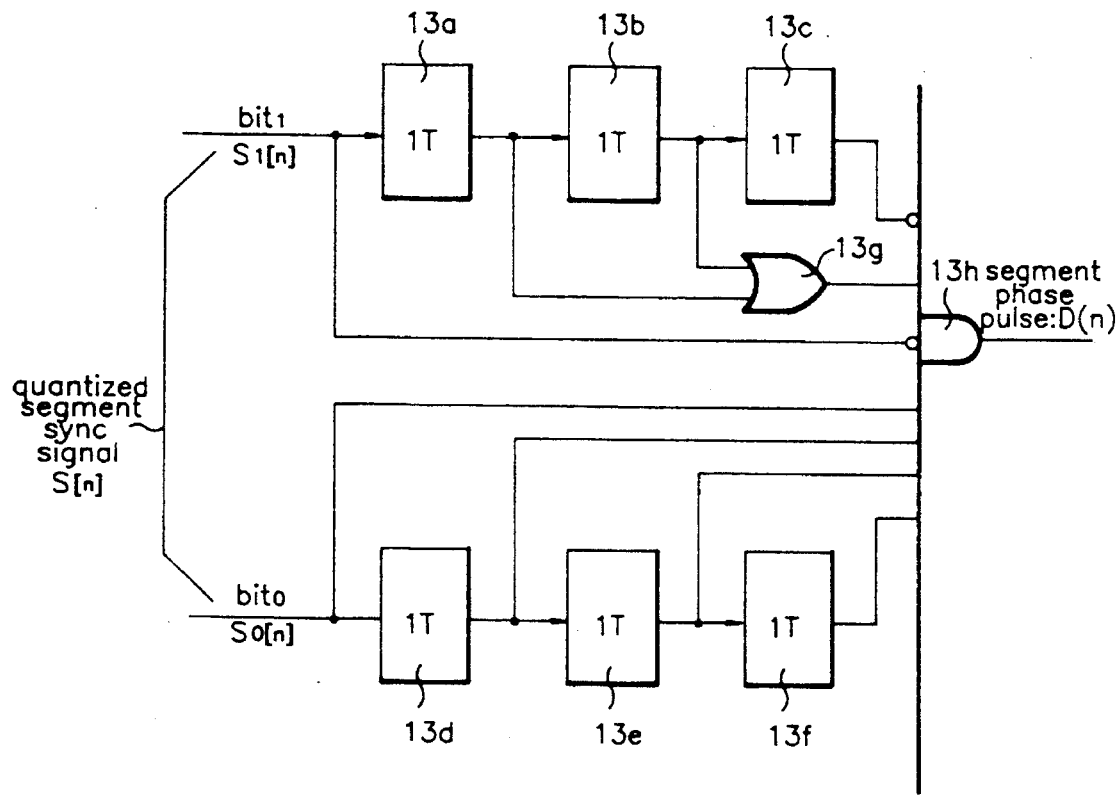
FIG. 5 is a block diagram of one embodiment of a segment sync signal pattern detector of FIG. 4.

As shown in FIG. 5, provided that the levels output from quantizer 12 are expressed in two bits, that is, first bit (bit1) and second bit (bit0), segment pattern detector 13 comprises first, second and third delays 13a, 13b and 13c for delaying the first bit (bit1) for a predetermined time sequentially, fourth, fifth and sixth delays 13d, 13e and 13f for delaying the second bit (bit0) for a predetermined time sequentially, an OR gate 13g for logically summing the output values of first and second delays 13a and 13b, and an AND gate 13h for receiving the inverted value of the first bit (bit1) input to first delay 13a, the inverted output of third delay 13c, the output of OR gate 13g, the inverted value of second bit (bit0) input to fourth delay 13d, and the outputs of fourth, fifth and sixth delays 13d, 13e and 13f.

The operation of the data segment sync signal will be explained with reference to the waveforms of FIGS. 6A–6E.

Figure 6A:
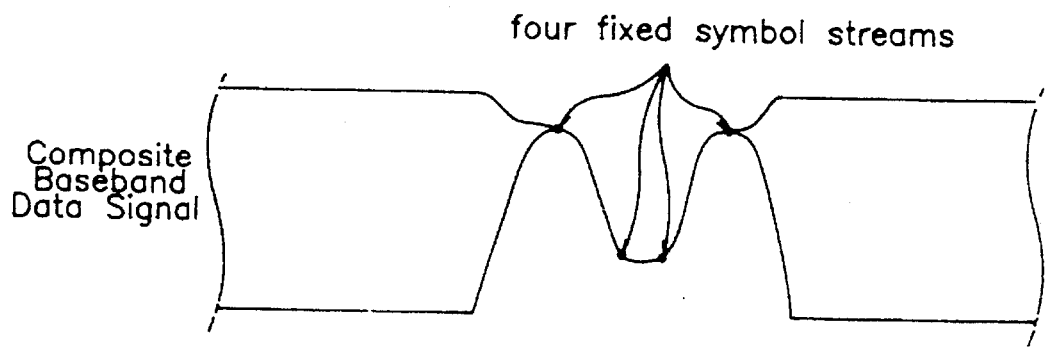
FIGS. 6A–6E are waveform diagrams present at respective components of the data segment sync signal detector of the present invention.

First, the received composite baseband data signal shown in FIG. 6A passes through adder 11b of segment accumulator 11, and is delayed for one segment in segment memory 11a.

Segment memory 11a stores the input composite baseband data in units of segment. When segment data is input, the stored segment data is output to adder 11b.

Figure 6B:

Adder 11b adds currently input segment data to one-segment-delayed segment data output from segment memory 11a. Through this process, data having a random value without relation for segment period is converged to "0," whereas only the segment sync signal of the same waveform for segment periods is left. Accordingly, segment accumulator 11 separates only the data corresponding to the segment sync signal from the composite baseband data, as shown in FIG. 6B.

Figure 6C:
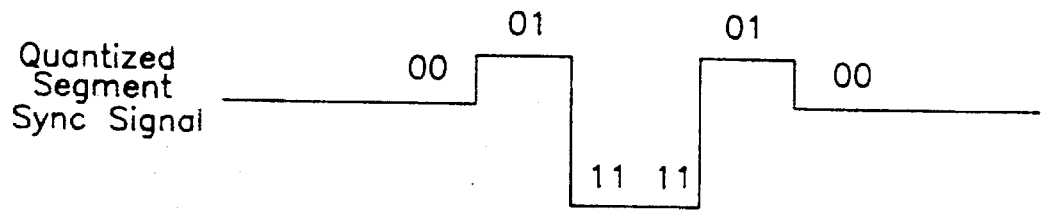

Quantizer 12 compares the output signal of segment accumulator 11 with two threshold values, and outputs a corresponding one out of three levels, as shown in FIG. 6C.

As explained above, the transmission side of HDTV signal loads four fixed symbol streams for the segment sync section. The four fixed symbol streams can be classified into three levels in quantizer 12. Therefore, the three levels can be expressed in two bits, respectively (for instance, 00, 11, and 01).

Figure 6D:

Segment sync signal pattern detector 13 detects segment sync signal patterns (00, 01, 11, 11, 01, 00) from the quantized sync signal output from quantizer 12 and shown in FIG. 6C. Using the patterns, a segment phase pulse of FIG. 6D is formed.

Figure 6E:
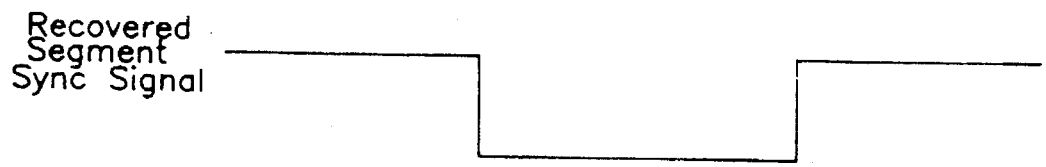

Segment sync signal generator 14 uses the segment phase pulse in order to make the recovered segment sync signal, as shown in FIG. 6E.

More specifically, according to the data format of Grand Alliance HDTV system, four fixed symbol streams are loaded in the segment sync signal section, as shown in FIG. 6A. These are repeated for segment periods. However, in video data excluding the sync signal section of respective segments, symbols of a predetermined value for segments periods are shown. For this reason, when the video data passes through segment accumulator 11, noise-free segment sync signal waveforms appear in the segment sync signal section, as shown in FIG. 6B. In the video data section, the predetermined values are countervailed with each other, approximating to "0."

The data corresponding to the segment sync signal is separated from other data.

As the separated segment sync signal data passes through quantizer 12, a quantized segment sync signal is generated, which can be shown in three levels. These respective levels are expressed in two bits (00, 01 and 11).

Segment sync signal pattern detector 13 detects segment sync signal patterns ( . . . 00, 01, 11, 11, 01, 00, . . . ) from the quantized segment sync signal, thereby obtaining phase information for respective segments.

A segment sync signal pattern detection logic will be described with FIG. 5, one embodiment of segment sync signal pattern detector 13.

In the quantized segment sync signal of FIG. 6C, waveform of 00 all is present in the video section. For the segment sync signal section, waveforms of 01, 11, 11, and 01 corresponding to the four fixed symbol streams are present. For this reason, four bits "1" are output serially as the second bit (bit0). For the first bit (bit1), bits are output in the sequence of "0"→"1"→"1"→"0."

The segment sync signal pattern detection logic can be expressed in the algorithm of the following equation (1).

$$D[n]=S_0[n]\cdot S_0[n-1]\cdot S_0[n-2]\cdot S[n-3]\cdot \overline{S_1[n]}\cdot S_1[n-1]\cdot S_1[n-2]\cdot \overline{S_1[n-3]} \quad (1)$$

where D[n] indicates the segment phase pulse signal at the n-th symbol;

$S[n]$ is the second bit (bit0) of the quantized segment sync signal at the n-th symbol;

$S_1[n]$ is the first bit (bit1) of the quantized segment sync signal at the n-th symbol;

· represents AND;

+ is OR; and

− indicates not.

In the state in which phase is not synchronized as in the initial operation of the segment sync signal detection, the waveforms of the quantized segment sync signal may be [ . . . 01, 01, 11, 01, 01, . . . ]. This indicates that the waveforms are spread more than the original state.

Therefore, it requires that a margin is provided in the segment sync signal pattern detection logic of FIG. 1, as in the following equation (2).

$$D[n]=S_0[n]\cdot S_0[n-1]\cdot S_0[n-2]\cdot S[n-3]\cdot \overline{S_1[n]}\cdot (S_1[n-1]\cdot S_1[n-2])\cdot S_1[n-3] \quad (2)$$

According to the algorithms of equations (1) and (2), respective segment phase pulses are obtained, performing segment sync signal detection substantially.

Finally, segment sync signal generator 14 receives a segment phase pulse from segment sync signal pattern detector 13, rendering the phase information of the segment sync signal as a waveform to be used in a symbol clock recovery or data detector.

As described above, the present invention is capable of detecting a data segment sync signal for respective segments accurately so that the phase of symbol clock is synchronized through a PLL. This allows the symbol clock recovery to be configured easily.

What is claimed is:

1. A data segment sync signal detector for an HDTV comprising:

a segment accumulator for separating data corresponding to a segment sync signal from a composite baseband data signal by using a composite baseband data signal of the present segment to a composite baseband data signal of a previously input segment;

a quantizer for comparing the output signal of said segment accumulator with predetermined threshold values so as to output level values in a predetermined number of bits, corresponding to a plurality of fixed symbol streams, that is, segment sync signal data; and a segment sync signal pattern detector for detecting the pattern of segment sync signal from the level values expressed in the predetermined number of bits output from said quantizer, thereby obtaining the phase information for respective segments and making respective segment phase pulses according to the phase information.

2. A data segment sync signal detector for an HDTV as claimed in claim 1, further comprising a segment sync signal generator for using the segment phase pulse output from said segment sync signal pattern detector, to make a recovered segment sync signal.

3. A data segment sync signal detector for an HDTV as claimed in claim 1, wherein said segment accumulator comprises:

a segment memory for delaying a composite baseband data signal for one segment; and an adder for adding the composite baseband data signal accumulated until the previous segment output from said segment memory and the composite baseband data signal of a currently input segment.

4. A data segment sync signal detector for an HDTV as claimed in claim 2, wherein said segment accumulator comprises:

a segment memory for delaying a composite baseband data signal for one segment; and an adder for adding the composite baseband data signal accumulated until the previous segment output from said segment memory and the composite baseband data signal of a currently input segment.

5. A data segment sync signal detector for an HDTV as claimed in claim 1, wherein said composite baseband data signal is data for segment sync signal for each segment sync section, containing four fixed symbol streams.

6. A data segment sync signal detector for an HDTV as claimed in claim 2, wherein said composite baseband data signal is data for segment sync signal for each segment sync section, containing four fixed symbol streams.

7. A data segment sync signal detector for an HDTV as claimed in claim 1, wherein, provided that the levels output from said quantizer are expressed in two bits, that is, first bit and second bit, said segment pattern detector comprises:

first, second and third delays for delaying the first bit for a predetermined time sequentially;

fourth, fifth and sixth delays for delaying the second bit for a predetermined time sequentially;

an OR gate for logically summing the output values of said first and second delays; and an AND gate for receiving the inverted value of the first bit input to said first delay, the inverted output of said third delay, the output of said OR gate, the second bit input to said fourth delay, and the outputs of said fourth, fifth and sixth delays.

8. A data segment sync signal detector for an HDTV as claimed in claim 7, wherein a segment sync signal pattern detection logic of said segment phase signal pattern detector can be expressed in the following algorithm:

$$D\{n\}=\overline{S_0\{n\}} \cdot S_0\{n-1\} \cdot S_0\{n-2\} \cdot S\{n-3\} \cdot \overline{S_1\{n\}} \cdot S_1\{n-1\} \cdot S_1\{n-2\} \cdot S_1\{n-3\}$$

where $D\{n\}$ indicates the segment phase pulse signal at the n-th symbol;

$S\{n\}$ is the second bit of the quantized segment sync signal at the n-th symbol;

$S_1\{n\}$ is the first bit of the quantized segment sync signal at the n-th symbol;

· represents AND;

+ is OR; and

− indicates not.

9. A data segment sync signal detector for an HDTV as claimed in claim 7, wherein a segment sync signal pattern detection logic of said segment sync signal pattern detector can be expressed as in the following algorithm:

$$D\{n\}=\overline{S_0\{n\}} \cdot S_0\{n-1\} \cdot S_0\{n-2\} \cdot S\{n-3\} \cdot \overline{S_1\{n\}} \cdot (S_1\{n-1\} \cdot S_1\{n-2\}) \cdot S_1\{n-3\}$$

where $D\{n\}$ indicates the segment phase pulse signal at the n-th symbol;

$S\{n\}$ is the second bit of the quantized segment sync signal at the n-th symbol;

$S_1\{n\}$ is the first bit of the quantized segment sync signal at the n-th symbol;

· represents AND;

+ is OR; and

− indicates not.

10. A data segment sync signal detector for an HDTV as claimed in claim 2, wherein, provided that the levels output from said quantizer are expressed in two bits, that is, first bit and second bit, said segment pattern detector comprises:

first, second and third delays for delaying the first bit for a predetermined time sequentially;

fourth, fifth and sixth delays for delaying the second bit for a predetermined time sequentially;

an OR gate for logically summing the output values of said first and second delays; and an AND gate for receiving the inverted value of the first bit input to said first delay, the inverted output of said third delay, the output of said OR gate, the second bit input to said fourth delay, and the outputs of said fourth, fifth and sixth delays.

11. A data segment sync signal detector for an HDTV as claimed in claim 10, wherein a segment sync signal pattern detection logic of said segment phase signal pattern detector can be expressed in the following algorithm:

$$D\{n\} = \underline{S_0\{n\}} \cdot S_0\{n-1\} \cdot S_0\{n-2\} \cdot S\{n-3\} \cdot \overline{S_1\{n\}} \cdot S_1\{n-1\} \cdot S_1\{n-2\} \cdot S_1\{n-3\}$$

where D{n} indicates the segment phase pulse signal at the n-th symbol;

S{n} is the second bit of the quantized segment sync signal at the n-th symbol;

$S_1\{n\}$ is the first bit of the quantized segment sync signal at the n-th symbol;

· represents AND;

+ is OR; and

− indicates not.

12. A data segment sync signal detector for an HDTV as claimed in claim 10, wherein a segment sync signal pattern detection logic of said segment sync signal pattern detector can be expressed as in the following algorithm:

$$D\{n\} = \underline{S_0\{n\}} \cdot S_0\{n-1\} \cdot S_0\{n-2\} \cdot S\{n-3\} \cdot \overline{S_1\{n\}} \cdot (S_1\{n-1\} \cdot S_1\{n-2\}) \cdot S_1\{n-3\}$$

where D{n} indicates the segment phase pulse signal at the n-th symbol;

S{n} is the second bit of the quantized segment sync signal at the n-th symbol;

$S_1\{n\}$ is the first bit of the quantized segment sync signal at the n-th symbol;

· represents AND;

+ is OR; and

− indicates not.

13. A data segment sync signal detector for an HDTV as claimed in claim 1, wherein said quantizer compares the output signal of said segment accumulator to thereby output three levels respectively composed of two bits.

14. A data segment sync signal detector for an HDTV as claimed in claim 2, wherein said quantizer compares the output signal of said segment accumulator to thereby output three levels respectively composed of two bits.

\* \* \* \* \*